United States Patent [19]

Kobayashi et al.

[11] 4,408,982

[45] Oct. 11, 1983

[54] PROCESS FOR FIRING A FURNACE

[75] Inventors: Hisashi Kobayashi, Tarrytown; John E. Anderson, Katonah, both of N.Y.

[73] Assignee: Union Carbide Corporation, Danbury, Conn.

[21] Appl. No.: 337,115

[22] Filed: Jan. 5, 1982

[51] Int. Cl.³ .............................................. F23M 3/04
[52] U.S. Cl. ..................... 431/10; 126/112; 431/12
[58] Field of Search ........................ 431/10, 4, 12, 62; 239/5, 8, 398, 418, 433; 126/110 C, 116 R, 112

[56] References Cited

U.S. PATENT DOCUMENTS

| | | | |
|---|---|---|---|
| 3,730,668 | 5/1973 | Iida et al. | 431/10 |
| 3,880,571 | 4/1975 | Koppang et al. | 431/8 |
| 4,021,188 | 5/1977 | Yamagishi et al. | 431/10 |
| 4,054,407 | 10/1977 | Carubba et al. | 431/10 |
| 4,060,376 | 11/1977 | Peredi | 431/10 |
| 4,289,474 | 9/1981 | Honda et al. | 431/10 |
| 4,308,810 | 1/1982 | Taylor | 110/347 |
| 4,343,606 | 8/1982 | Blair et al. | 431/10 |
| 4,364,724 | 12/1982 | Alpkuist | 431/12 |
| 4,375,950 | 3/1983 | Durley | 431/12 |
| 4,378,205 | 3/1983 | Anderson | 431/5 |

Primary Examiner—Daniel J. O'Connor
Attorney, Agent, or Firm—Stanley Ktorides

[57] ABSTRACT

A method for minimizing the amount of nitrogen oxide pollutants produced in a process for firing a furnace using oxygen or an oxygen-enriched gas as the oxidant, in which furnace gases are aspirated into the oxidant jet prior to combustion and in which the furnace is operated using alternating low firing rate and high firing rate periods, by delaying the injection of oxidant at the high rate at the start of the high firing rate period.

4 Claims, 4 Drawing Figures

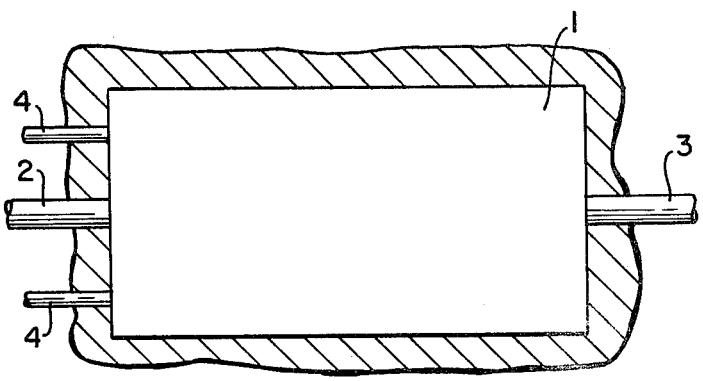
FIG. IA
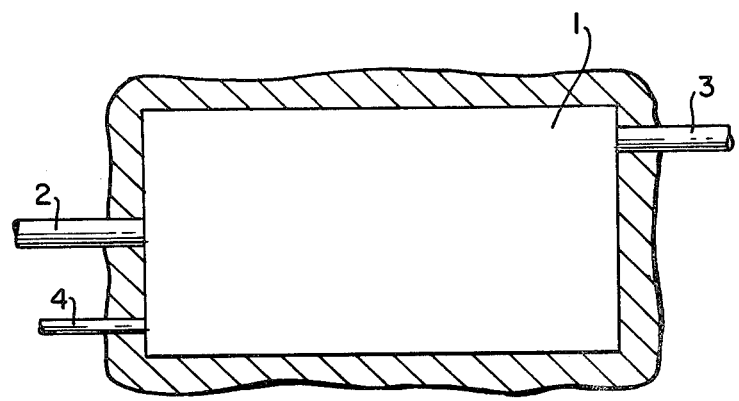
FIG. IB
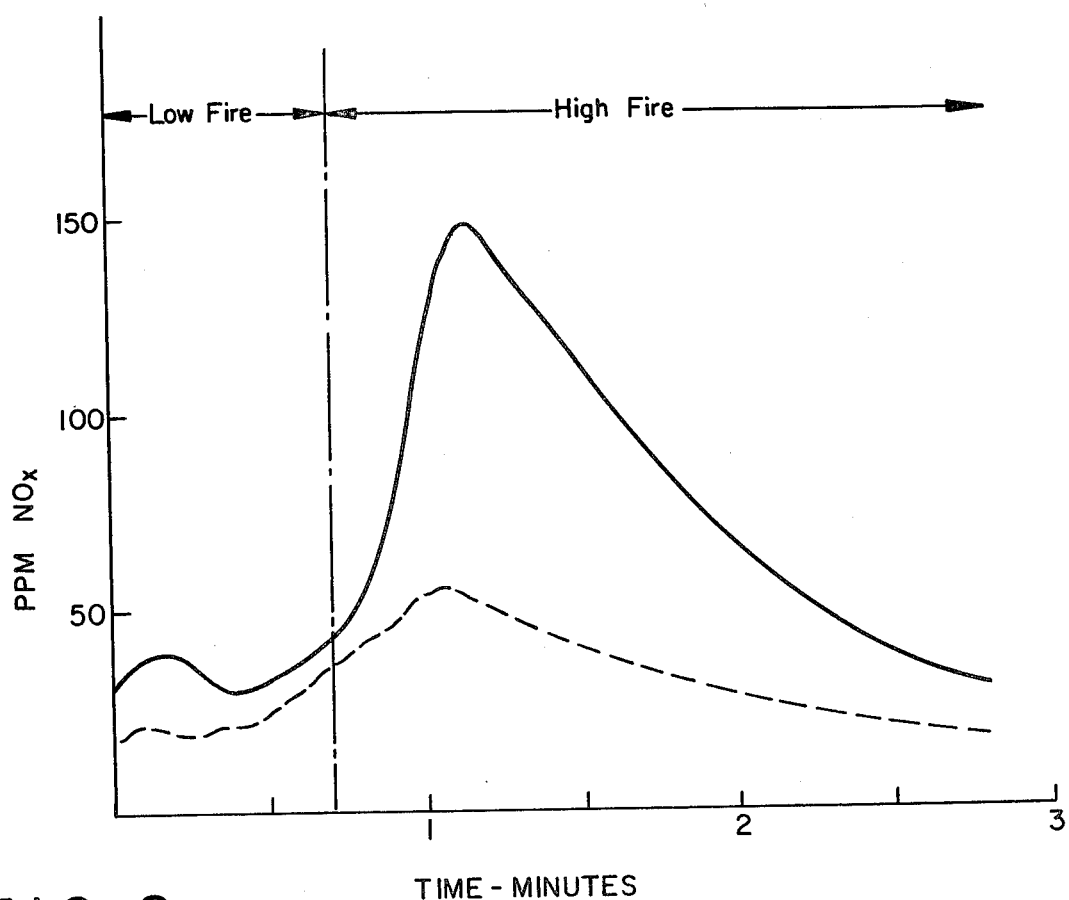
FIG. 2

PROCESS FOR FIRING A FURNACE

DESCRIPTION

TECHNICAL FIELD

This invention relates to an improved process for firing a furnace wherein oxygen or an oxygen-enriched gas is employed as the oxidant and wherein the furnace is operated using a low firing rate and a high firing rate firing cycle.

BACKGROUND ART

A recent significant advance in the art of firing a furnace has been the development of an apparatus and a process which allow one to employ oxygen or oxygen-enriched air as the oxidant gas in the furnace firing operation while substantially avoiding such heretofore unavoidable problems as burner and furnace damage due to high flame temperature, and poor furnace gas mixing due to the smaller volumes of oxidant and fuel gas employed. The above-mentioned apparatus and process is the subject of U.S. patent application Ser. No. 138,759, filed on Apr. 10, 1980, by J. E. Anderson, and is incorporated herein in its entirety by reference. Among the many advantages of the Anderson apparatus and process is the considerable reduction in nitrogen oxides emissions (herein also referred to as NOx) which are considered significant pollutants.

An often-employed method of firing a furnace is one which uses alternating high firing rates and low firing rates. By firing rate, is meant the rate at which fuel and oxidant is supplied to a burner or furnace and is expressed in units of heat per unit of time. Alternating high and low firing rate periods are employed as a convenient technique for maintaining the furnace temperature within a given range.

Generally, a furnace will have, for any particular application, a temperature at which it is intended to operate. One way of maintaining this intended temperature is to use the afore-mentioned high and low firing rate cycle. In practice, the furnace may be fired until it attains the intended temperature; the furnace is then fired again at the low firing rate until the furnace temperature drops to a predetermined minimum; the furnace is then fired at the high firing rate until the furnace temperature reaches a predetermined maximum, which is higher than the intended temperature. The furnace is then fired at the low firing rate until the predetermined minimum temperature is reached. The cycle continues as long as required by the application.

When a furnace is fired using oxygen or oxygen-enriched air as the oxidant and in such a manner as to cause aspiration of the surrounding furnace gases into the oxidant prior to combustion, as with the process described in said U.S. application Ser. No. 138,759, a marked increase in the level of NOx emissions may be observed when the high and low firing rate cycle is used to maintain an intended temperature, as compared to the level of NOx emissions found when the furnace is fired at an essentially constant firing rate.

Accordingly, it is an object of this invention to provide a process for firing a furnace which allows one to use oxygen or an oxygen-enriched gas as the oxidant and to use an alternating high firing and low firing rate cycle, while reducing the level of nitrogen oxides generated to an acceptable level.

DISCLOSURE OF THE INVENTION

The above and other objects which will become apparent to those skilled in the art are achieved:

In a process for firing a furnace by combusting fuel and oxidant gas, thereby producing furnace gases, wherein at least one jet of oxidant gas, selected from the group consisting of oxygen-enriched air and oxygen, and at least one jet of fuel are injected into the furnace aspirating the furnace gases into the oxidant jet prior to combustion, and wherein the furnace, in order to maintain a given temperature range which incorporates a specified temperature, is fired using alternating high and low firing rate periods, said low firing rate period being characterized by injection into the furnace of fuel and oxidant at flow rates such that substantial leakage of air into the furnace is caused to occur, followed by a high firing rate period characterized by injection into the furnace of fuel and oxidant at flow rates, each greater than their respective flow rates during the low firing rate period, such that little or no air leakage into the furnace is caused to occur, the improvement comprising reducing NOx emissions to an acceptable level by delaying the injection of oxidant at the high firing rate at the start of the high firing rate period for a finite time no greater than S, wherein S is given by the formula:

$$S = (4.12 \times 10^5) V/FT$$

wherein:
S is the time delay in seconds,
V is the furnace volume in cubic meters,
F is the firing rate during the high firing period in kilocalories per second, and
T is the specified temperature in °K.

The term, oxygen-enriched air, is used herein to mean air having an oxygen content greater than the naturally occurring oxygen content.

The term, furnace, is used herein to mean an enclosed space or zone in which heat is intentionally released by combustion of fuel and oxidant to produce furnace gases.

BRIEF DESCRIPTION OF THE DRAWINGS

FIG. 1A is a top view, schematic representation of the furnace employed to conduct Examples 1 and 2.

FIG. 1B is a side view, schematic representation of the furnace employed to conduct Examples 1 and 2.

FIG. 2 is a graphical representation of NOx emissions against time obtained in Example 1.

DETAILED DESCRIPTION

Figure 3:
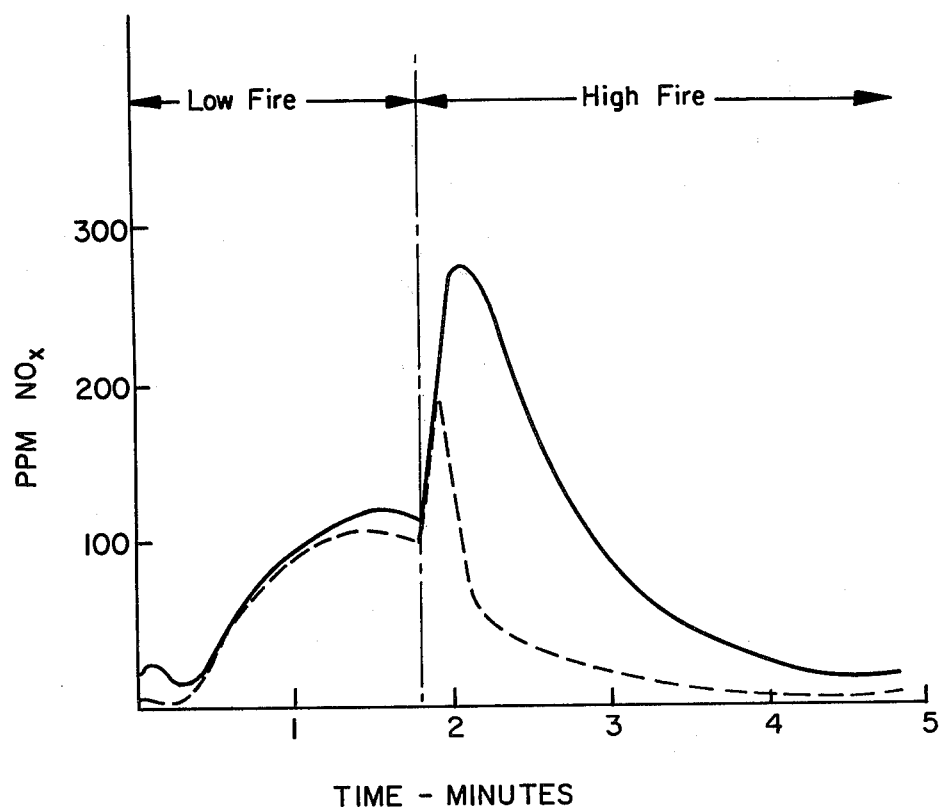
FIG. 3 is a graphical representation of NOx emissions against time obtained in Example 2.

This invention comprises the discovery that when a furnace using oxygen or oxygen-enriched air as the oxidant is operated in such a manner that furnace gases are aspirated into the oxidant prior to combustion and using alternating high and low firing rate periods, a significant and unexpectedly large decrease in NOx emissions is obtained during the high firing rate period if the increase in the oxidant flow rate is delayed for a finite period of time after the initiation of the high firing rate period; such period of delay being no greater than the time period S.

The time period S is given by the formula:

$$S = (4.12 \times 10^5) V/FT$$

wherein:

V is the volume of the furnace in M³,

F is the high firing rate in KCAL/sec and

T is the operating temperature of the furnace is °K.

As mentioned, S is the maximum delay time for the start of the high firing rate oxidant flow rate. The delay time is finite, i.e., always greater than zero. However, there is no absolute lower limit, and some reduction in NOx formation will be observed even when small time delays, as small as one second, for example, are employed. Preferably, the time delay will be from 0.1S to 0.9S, and most preferably from 0.3S to 0.7S. It has been found that in actual practice the preferred time delay is from about 5 to 10 seconds.

Although the oxidant flow rate during the delay time is less than the high firing rate period flow rate, it need not be zero nor equal to the low firing rate period flow rate. As a practical matter, the oxidant flow rate during the delay time may be about the same as that used during the low firing rate period.

While not wishing to be bound by an theory, it is believed that the desirable results achieved by this invention may be explained as follows. In a furnace, furnace gases are drawn out of the furnace, for example, through the chimney and around the furnace doors. During the time the furnace is operated at the high firing rate, the high flow rate of fuel and oxidant into the furnace to achieve the high firing rate is sufficient to replace the furnace gases which are drawn out of the furnace. Thus little or no air leaks into the furnace. However, during the time the furnace is operated at the low firing rate, the lower flow rate of fuel and oxidant into the furnace is not sufficient to replace the furnace gases which are drawn out of the furnace. This results in negative pressure inside the furnace and air leaks into the furnace through a number of openings.

It is known that NOx formation is significantly increased at higher temperatures. In a process wherein furnace gases, which are generally carbon dioxide and water vapor, are aspirated into the oxidant jet prior to combustion, the flame temperature is lower than normal due to the lower oxygen concentration resulting from the dilution of oxidant with furnace gases. This lower than normal flame temperature results in reduced NOx formation. However, when such a furnace firing process is carried out using alternating low and high firing rate periods, the furnace atmosphere at the end of the low firing rate period is in large part air because of the previously described air leakage into the furnace. Hence, when the high firing rate period begins, air is aspirated into the oxidant jet instead of furnace gases. This results in a higher oxygen concentration which results in a higher flame temperature and a greater rate of NOx formation. The NOx formation rate decreases as the air in the furnace is replaced by furnace gases. As mentioned previously, air does not leak into the furnace during the high firing rate period.

When, at the start of the high firing rate period, the injection of oxidant at the high firing rate flow rate is delayed for a short period of time, the fuel is combusted primarily with the oxygen in the air inside the furnace. Because of the high flow rate of fuel, this oxygen in the air is rapidly depleted and when the oxidant is injected into the furnace at the high firing rate flow rate, there is little or no oxygen inside the furnace to aspirate into the oxidant jet. Thus the oxidant is diluted without admixture with oxygen-containing air, and thus the high oxygen concentration is avoided. This results in lower flame temperature and lower NOx formation.

This invention comprises not merely the discovery that such a time delay is beneficial for lower NOx formation, but also quantification of the time delay for any suitable furnace and operating conditions. Furthermore, it has been discovered that the time delay has a maximum for any furnace and operating condition beyond which incomplete combustion caused by lack of oxidant will result. As is known, such incomplete combustion is inefficient, generates considerable pollution, and may be hazardous.

The following examples are intended only to illustrate the process of this invention and not to limit it in any way.

The illustrative examples reported herein were carried out in a test furnace represented schematically in FIGS. 1A and 1B in top and side views respectively. The burner employed was substantially the same as that disclosed in commonly assigned copending U.S. application, Ser. No. 138,759 filed Apr. 10, 1980. The general procedure was as follows:

The test furnace, which had a volume of about 3.6 M³, was operated using the high firing rate until the high set point temperature was reached. Thereafter, there were employed alternating low and high firing rate periods. The fuel, natural gas having a gross heating value of about 9000 KCAL/M³ (1000 BTU/ft³), was introduced at the low firing flow rate to the furnace 1 through the burner 2. A small amount of oxidant was also introduced through the burner. Air was introduced into the furnace through port 3 in order to simulate air leakage into the furnace during the low firing period in a commercial furnace. The gases exited through flues 4 where they were analyzed for NOx content.

When the temperature reached the low set point the furnace was operated at the high firing rate until the high set point temperature was reached. During the high firing period, no air was introduced into the furnace.

Each illustrative example was carried out in two parts. In part 1 the oxidant was introduced immediately at the start of the high fire period, i.e., there was no time delay. Thus, part 1 of each example illustrates furnace operation without employing the process of this invention. In part 2 the oxidant was introduced after a certain time delay—in Example 1 the time delay was 7 seconds and in Example 2 the time delay was 9.8 seconds. Thus, part 2 of each example illustrates furnace operation using the process of this invention. In each example the oxidant employed was commercially pure oxygen.

The instantaneous NOx readings in the flue gas in parts per million (ppm) are shown in graphical form in FIGS. 2 and 3. FIG. 2 illustrates the instantaneous NOx concentration in the flue gas as a function of time for Example 1. The solid line represents the NOx concentration during part 1 and the dotted line represents the NOx concentration during part 2. Similarly, FIG. 3 illustrates the instantaneous NOx concentration in the flue gas for Example 2, the solid line representing part 1 and the dotted line representing part 2. Examples 1 and 2 are summarized in Table I below.

TABLE I

| | Example 1 | | Example 2 | |
|---|---|---|---|---|
| | Part 1 | Part 2 | Part 1 | Part 2 |
| Fuel Flow Rate (M³/hr) | | | | |

TABLE I-continued

|  | Example 1 | | Example 2 | |
| --- | --- | --- | --- | --- |
|  | Part 1 | Part 2 | Part 1 | Part 2 |
| High | 20.4 | 20.4 | 25.2 | 25.2 |
| Low | 2.2 | 2.2 | 2.2 | 2.2 |
| Oxidant Flow Rate (M³/hr) | | | | |
| High | 45.6 | 45.6 | 54.7 | 54.7 |
| Low | 4.5 | 4.5 | 4.5 | 4.5 |
| Firing Rate (KCAL/sec) | | | | |
| High | 51 | 51 | 63 | 63 |
| Low | 5.5 | 5.5 | 5.5 | 5.5 |
| Air Flow (M³/hr) | 77.9 | 77.3 | 164 | 164 |
| Intended Temperature (°C.) | 1260 | 1260 | 1260 | 1260 |
| Set Point Temperature (°C.) | | | | |
| High | 1270 | 1270 | 1280 | 1280 |
| Low | 1250 | 1250 | 1210 | 1210 |
| S (sec) | — | 19 | — | 16 |
| Actual Time Delay | | | | |
| (sec) | — | 7 | — | 9.8 |
| (S) | — | 0.36S | — | 0.61S |
| Overall NOx (10⁹ gms/Joule) | 15.1 | 7.1 | 29.8 | 17.8 |
| % Reduction in NOx In Part 2 | | | | |
| During High Firing | | 57 | | 70 |
| During Low Firing | | 34 | | 12 |
| Overall | | 53 | | 40 |

As can readily be seen from Table I and FIGS. 2 and 3, a significant reduction in NOx formation was achieved by the improved process of this invention as shown in (parts 2 of Examples 1 and 2) as compared to (parts 1 of Examples 1 and 2) in which this invention was not practiced. In Example 1, the NOx reduction was 53 percent while in Example 2 the NOx reduction was 40 percent.

We claim:

1. In a process for firing a furnace by combusting fuel and oxidant gas, thereby producing furnace gases, wherein at least one jet of oxidant gas, selected from the group consisting of oxygen-enriched air and oxygen, and at least one jet of fuel are injected into the furnace aspirating the furnace gases into the oxidant jet prior to combustion, and wherein the furnace, in order to maintain a given temperature range which incorporates a specified temperature, is fired using alternating high and low firing rate periods, said low firing rate period being characterized by injection into the furnace of fuel and oxidant at flow rates such that substantial leakage of air into the furnace is caused to occur followed by a high firing rate period characterized by injection into the furnace of fuel and oxidant at flow rates, each greater than their respective flow rates during the low firing rate period, such that little or no air leakage into the furnace is caused to occur, the improvement comprising reducing NOx emissions to an acceptable level by delaying the injection of oxidant at the high firing rate at the start of the high firing rate period for a finite time no greater than S, wherein S is given by the formula:

$$S = (4.12 \times 10^5) V/FT$$

wherein:
S is the time delay in seconds,
V is the furnace volume in cubic meters,
F is the firing rate during the high firing period in kilocalories per second, and
T is the specified temperature in °K.

2. The process of claim 1 wherein the time delay is in the range of from 0.1S to 0.9S.

3. The process of claim 1 wherein the time delay is in the range of from 0.3S to 0.7S.

4. The process of claim 1 wherein said oxidant gas is commercially pure oxygen.

* * * * *